United States Patent [19]

Honegger

[11] Patent Number: 5,776,632
[45] Date of Patent: Jul. 7, 1998

[54] HERMETIC SEAL FOR AN ELECTROCHEMICAL CELL

[75] Inventor: Allen Honegger, East Amherst, N.Y.

[73] Assignee: Wilson Greatbatch Ltd., Clarence, N.Y.

[21] Appl. No.: 729,673

[22] Filed: Oct. 3, 1996

[51] Int. Cl.⁶ .................................................. H01M 2/08
[52] U.S. Cl. ........................ 429/185; 429/162; 429/171; 429/181
[58] Field of Search ...................... 429/162, 171, 429/174, 181, 184, 185

[56] References Cited

U.S. PATENT DOCUMENTS

| | | |
|---|---|---|
| 3,489,266 | 1/1970 | Miller . |
| 3,661,650 | 5/1972 | Flynn . |
| 3,928,071 | 12/1975 | Thornton ............................ 136/83 |
| 3,982,959 | 9/1976 | Partridge et al. ................... 429/163 |
| 4,182,028 | 1/1980 | Epstein et al. ...................... 29/623 |
| 4,233,372 | 11/1980 | Bro et al. ........................... 429/184 |
| 4,252,873 | 2/1981 | Epstein et al. ..................... 429/181 |
| 4,279,975 | 7/1981 | Bowsky ............................. 429/181 |
| 4,324,847 | 4/1982 | Athearn ............................. 429/181 |
| 4,329,405 | 5/1982 | Zupancic ........................... 429/174 |
| 4,437,231 | 3/1984 | Zupancic ........................... 29/623 |
| 4,544,078 | 10/1985 | Arenas et al. ..................... 220/256 |
| 4,592,970 | 6/1986 | Zupancic ........................... 429/82 |
| 4,748,094 | 5/1988 | Howard et al. .................... 429/90 |
| 4,913,986 | 4/1990 | Howard et al. .................... 429/90 |
| 5,004,656 | 4/1991 | Sato et al. ......................... 429/162 |
| 5,015,542 | 5/1991 | Chaney, Jr. et al. ............... 429/56 |
| 5,114,808 | 5/1992 | Chaney, Jr. et al. ............... 429/172 |
| 5,173,375 | 12/1992 | Cretzmeyer et al. .............. 429/185 |
| 5,250,373 | 10/1993 | Muffoletto et al. ................ 429/161 |
| 5,306,581 | 4/1994 | Taylor et al. ...................... 429/181 |

FOREIGN PATENT DOCUMENTS

| | | |
|---|---|---|
| 616025 | 2/1980 | Germany . |
| 2093629 | 2/1989 | United Kingdom . |

*Primary Examiner*—Kathryn L. Gorgos
*Assistant Examiner*—Carol Chaney
*Attorney, Agent, or Firm*—Hodgson, Russ, Andrews, Woods & Goodyear LLP

[57] ABSTRACT

A final closure sealing member and a method for hermetically sealing an opening, such as an electrolyte fill opening in an electrochemical cell or a battery, are disclosed. After a cell is fully assembled and filled with electrolyte, the present sealing member is force-fit into sealing registry with the electrolyte fill opening to form a secondary seal for the cell. Preferably, an outwardly facing portion of the sealing member is flush or slightly recessed with the side wall surrounding the fill opening. Then, the outwardly facing portion is welded to the opening side wall to form a primary hermetic seal.

7 Claims, 3 Drawing Sheets

HERMETIC SEAL FOR AN ELECTROCHEMICAL CELL

BACKGROUND OF THE INVENTION

1. Field of the Invention

The present invention generally relates to the conversion of chemical energy to electrical energy. More particularly, the present invention relates to the art of sealing an electrochemical cell or battery and, still more particularly, to hermetically sealing the electrolyte charging or fill opening in an electrochemical cell by means of a unitary sealing member. The unitary sealing member of the present invention is first force-fit into sealing registry with the electrolyte fill opening to provide a secondary seal that prevents out gassed by-products from compromising the primary, hermetic weld between the sealing member and the cell casing.

2. Prior Art

Leakage of electrolyte and gases from an electrochemical cell caused by a compromised seal is extremely undesirable and can even be fatal when the cell is used as the power source for an implantable medical device and the like. In electrochemical cells having a metal casing, one means of providing a hermetic seal for an electrolyte fill opening and the like is by welding a seal member in the casing. However, the casing proximate the weld conducts heat to the electrolyte contained therein and some electrolyte evaporation invariably occurs. When these gases escape from the cell casing they are referred to as out gassed by-products and such escaping gases leave pin holes in the weld thereby compromising hermeticity.

U.S. Pat. No. 5,004,656 to Sato et al. discloses a flat-type battery having a hermetically sealed electrolyte charging opening. The sealing member consists of a spherically-shaped body press-fit into sealing registry with the charging opening followed by a disc-shaped plate covering the sealing body and welded to the battery casing. The spherically-shaped sealing body and the disc-shaped plate can be separate members or combined as an integral unit. In any event, this prior art patent discloses that the press fit sealing body prevents compromise of the weld between the disc-shaped plate and the battery casing caused by escaping out gassed by-products.

Thus, the prior art recognizes that it is extremely important for a hermetically sealed cell to retain its manufactured, gas tight condition, even after prolonged periods of storage or use. This is nowhere more important than in electrochemical cells used in implantable medical devices and the like. Sato et al. and others have recognized that simply welding a sealing means over a cell opening does not necessarily assure gas tight hermeticity. Instead a secondary seal is required to prevent evaporated electrolyte gases from escaping and causing the formation of pin holes in the primary weld. However, it is also desirable to minimize the size of such cells by reducing their volume and to simplify the manufacturing and assembly processes by reducing the number of cell components. Furthermore, the seal member should be confined within the perimeter of the electrolyte fill opening and not protrude beyond the outer surface of the cell casing to provide the casing with an aesthetic profile. Therefore, in addition to providing a hermetically sealed fluid filled container, uncompromised by out gassed by-products, a primary object of the present invention is that the seal does not hinder the insertion of the container, for example, a cell or battery, into a receptacle for the cell in an implantable medical device and the like, where a premium is placed on economy of size.

SUMMARY OF THE INVENTION

The present invention addresses and solves the problems indicated above by providing a unitary sealing member, preferably of metal, that reliably, efficiently and hermetically closes an opening in a fluid filled container. In an electrochemical cell, the opening can be the electrolyte fill opening in a cell casing. In assembly, the present sealing member is first force-fit into sealing registry with the electrolyte fill opening to provide a secondary seal for the opening. In this position, an outwardly projecting bulbous portion or protuberance of the sealing member is somewhat recessed or flush with the casing side wall surrounding the fill opening. The bulbous portion is then welded to the casing while the secondary seal prevents out gassed by-products from compromising hermeticity. In that respect, not only does the present unitary sealing member provide a hermetic seal for the electrolyte fill opening, but no portion of the sealing member extends beyond the opening to the outer surface of the casing. Consequently, the profile of the cell is not interrupted by the seal and the outer surface of the casing remains free of sealing welds.

The foregoing and additional advantages of the present invention will be readily apparent upon a reading of the following detailed description together with the appended drawings.

BRIEF DESCRIPTION OF THE DRAWING FIGURES

Figure 1:
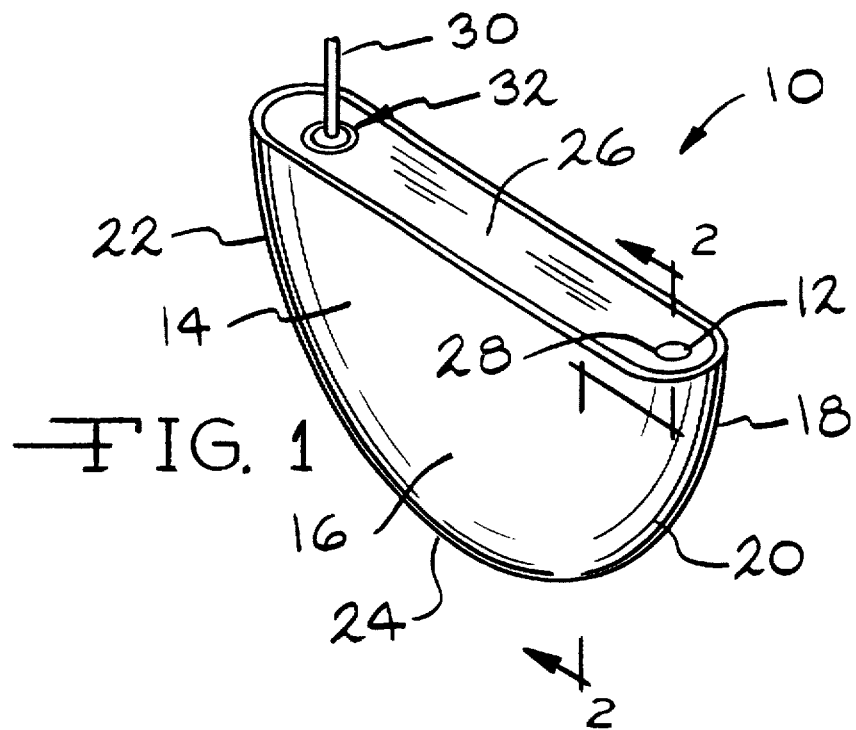
FIG. 1 is a perspective view of an exemplary electrochemical cell 10 provided with a hermetic sealing means 12 according to the present invention.
Figure 3:
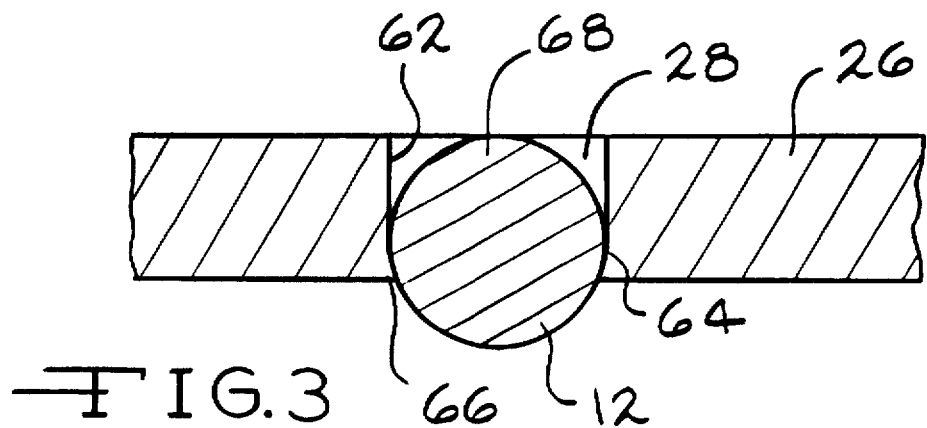

FIG. 3 is an enlarged, partial cross-sectional view of the electrochemical cell 10 shown in FIG. 1 having the lid 26 of the cell provided with a sealing member 12 in a force-fit, secondary sealing engagement according to the present invention.

Figure 4:
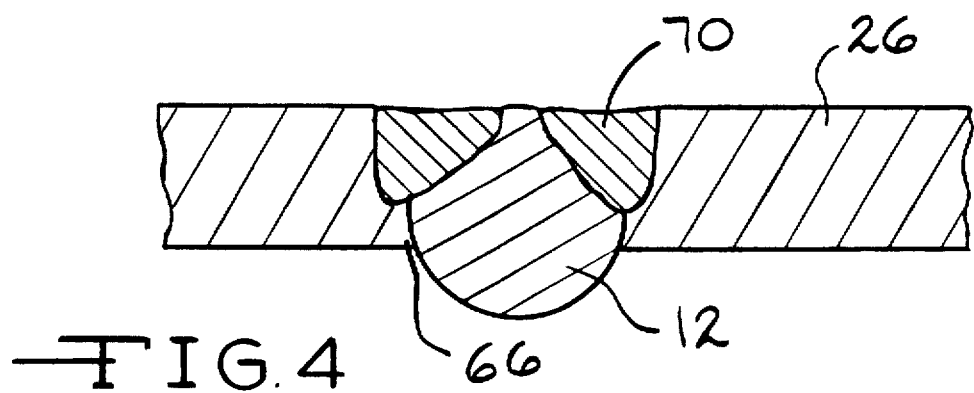

FIG. 4 is an enlarged, partial cross-sectional view of the electrochemical cell 10 shown in FIG. 3 with the sealing member 12 in a primary sealing engagement provided by weld 70.

Figure 5:
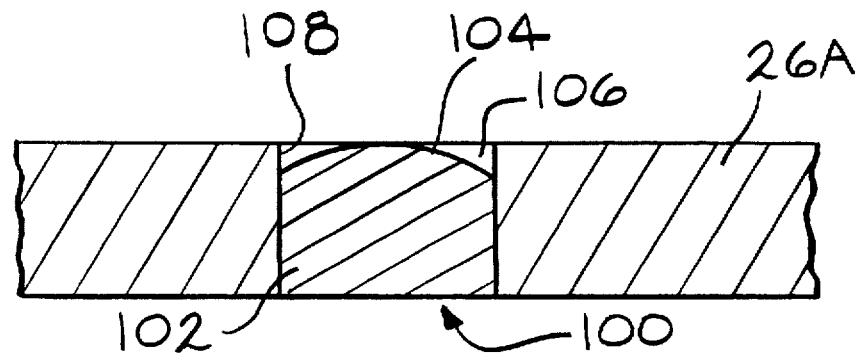
Figure 6:
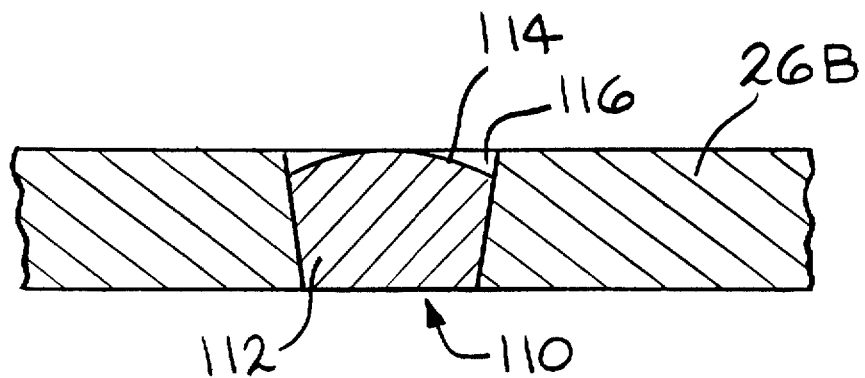
Figure 7:
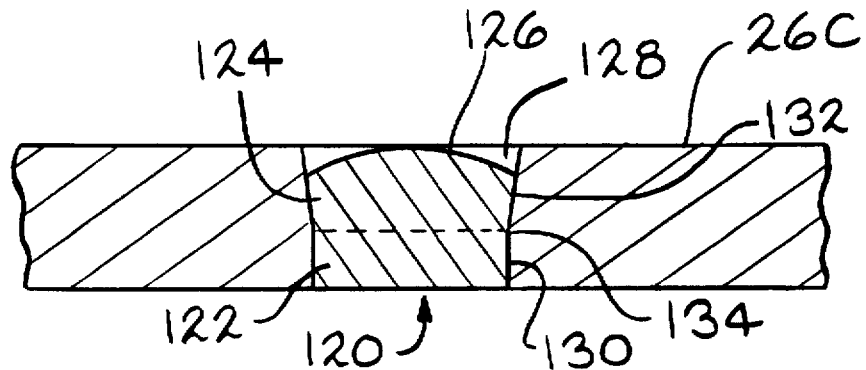

FIGS. 5 to 7 are alternate embodiments of sealing means according to the present invention.

DETAILED DESCRIPTION OF THE ILLUSTRATED EMBODIMENT

Figure 2:
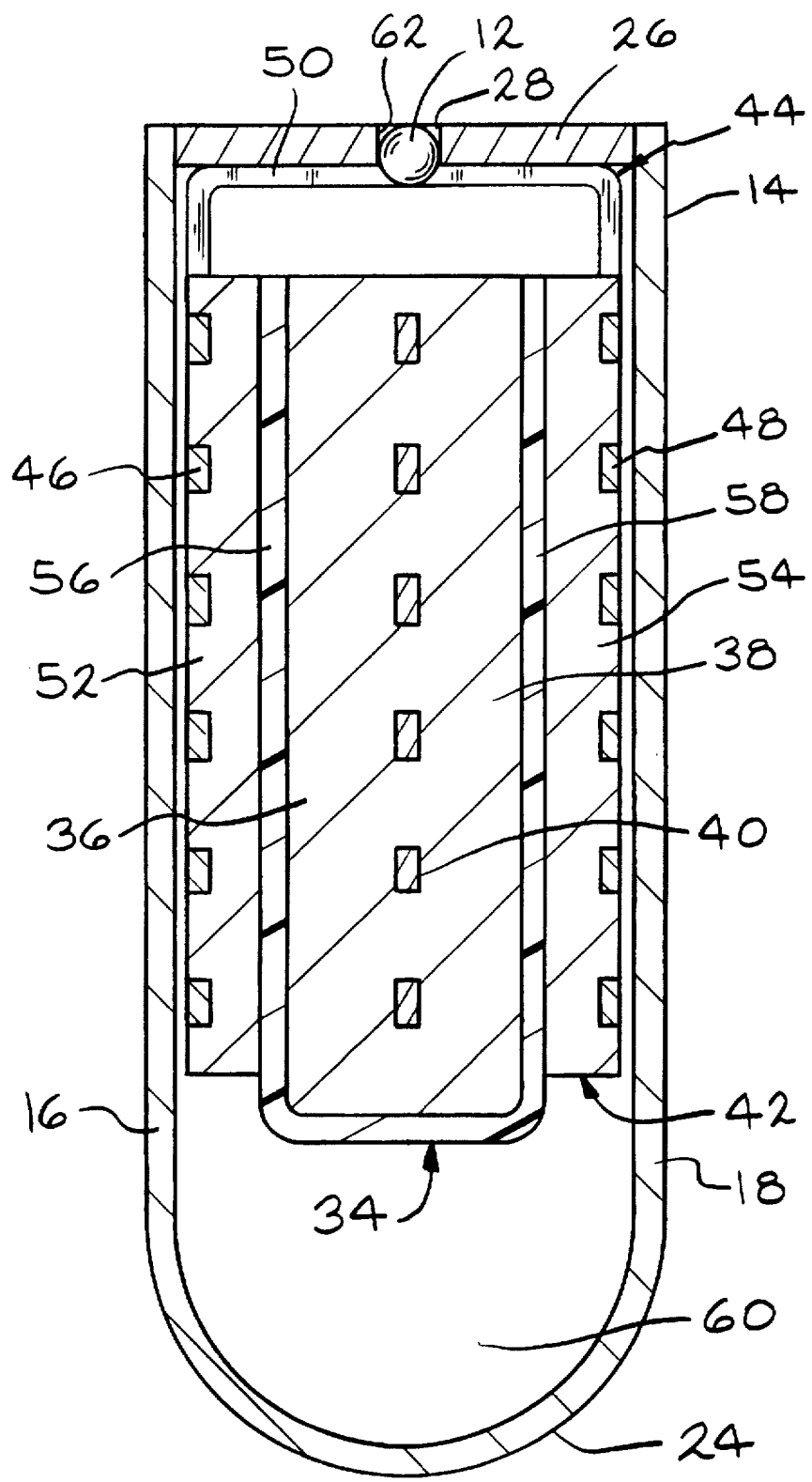
FIG. 2 is a cross-sectional view of the electrochemical cell 10 taken along line 2—2 of FIG. 1.

Referring now to the drawings, FIG. 1 shows a perspective view and FIG. 2 shows a cross-sectional view of an exemplary electrochemical cell 10 provided with a hermetic sealing means, for example, spherical shaped sealing member 12 (FIG. 3) according to the present invention. While cell 10 is shown having a half-rounded shape, it will be readily apparent to those skilled in the art that in its broadest form the present hermetic sealing means is useful with all types and kinds of closed containers intended to hermetically hold a fluid (both in the gaseous and liquid form), independent of the spatial orientation of the container. The closed containers can have various shapes and sizes and, illustrative cell 10 should not be considered as limiting the present invention only to electrochemical cells. In that respect, the hermetic sealing means of the present invention is useful for providing a gas tight, hermetic seal in any opening in a container having any shape and size. Further, the hermetic sealing means of the present invention is readily adapted for closing electrochemical cells having various types of chemistries such as alkali metal/solid cathode or alkali metal/oxyhalide electrochemical cells of both the solid cathode and liquid catholyte types.

As shown in FIG. 1. exemplary electrochemical cell 10 includes a casing 14 having spaced-apart front and back side walls 16 and 18 joined by curved end walls 20 and 22 and a curved bottom wall 24. The open top of the casing 14 is closed by a lid 26. lid 26 has an opening 28 that serves as a port for filling the casing 14 with electrolyte after the cell internal components have been assembled therein and lid 26 has been welded to the casing 14. In its final and fully assembled condition, the sealing means according to the present invention is hermetically sealed in the electrolyte fill opening 28 to close the cell in a gas tight manner. The casing 14. lid 26 and sealing member 12 are preferably of a conductive material. Suitable materials include nickel, aluminum, stainless steel, mild steel, nickel plated mild steel and titanium. Preferably, the casing 14. lid 26 and sealing member 12 are of the same material.

A terminal lead 30 for either the anode electrode or the cathode electrode is electrically insulated from the lid 26 and the casing 14 by a glass-to-metal seal 32. In a case-negative cell configuration, the lead 30 serves as the cathode terminal and the lid 26 and casing 14 serve as the negative or anode terminal, as is well known to those skilled in the art.

Referring now to FIG. 2. exemplary cell 10 is of the liquid electrolyte type comprised of a cathode electrode having a body 34 of solid cathode material in the form of plates 36, 38 pressed together and bonded against a cathode current collector 40. The cathode active material is preferably comprised of a metal, a metal oxide, a mixed metal oxide or a metal sulfide, and the cathode current collector 40 is fabricated from a thin sheet of metal. Suitable materials for the current collector include nickel, aluminum, stainless steel, mild steel and titanium.

Cell 10 further includes an anode electrode, generally designated 42, comprising a unitary, conductive member 44 which serves as the anode current collector and is fabricated from a thin sheet of metal such as nickel, having a pair of wing-like sections 46 and 48 joined by an intermediate web section 50. Anode elements 52 and 54 are in pressure bonded contact with and carried by corresponding ones of the electrode wing-like sections 46 and 48, respectively.

The anode element 52 is in operative contact with the cathode plate 36 through a thin sheet of separator material 56. Similarly, anode element 54 is in operative contact with cathode plate 38 through a thin sheet of separator material 58 such that separator sheets 56 and 58 surround and envelope the cathode body 34 to prevent direct physical contact with the anode plates 52, 54.

The terminal lead 30 connected to the cathode current collector 40 extends through a header assembly comprising the glass-to-metal seal 32 fitted in the lid 26. Lead 30 is the positive electrical terminal, being connected to the cathode body 34. With the anode electrode 42 being in operative contact with the conductive casing 14 through the web section 50 of the anode current collector in electrical contact with the lid 26 welded to the casing 14, the exemplary cell 10 of this embodiment of the present invention is in a case-negative electrical configuration.

Cell 10 is completed by an electrolyte 60 provided in casing 14 to activate the anode and the cathode. In the exemplary electrochemical cell shown, the electrolyte is a liquid electrolyte, however, the sealing means of the present invention is useful in cell chemistries having both liquid electrolytes and catholytes as well as those of a solid chemistry. Thus, the electrolyte 60 is hermetically sealed in the casing 14 closed by lid 26 by the provision of the sealing member 12 of the present invention.

As shown in FIGS. 2 and 3. the spherically shaped sealing member 12 of the present sealing means is sized to force-fit into sealing registry with the electrolyte fill opening 28 to form a secondary seal for the cell 10 until such time as the primary cell seal is formed by welding member 12 to the side wall 62 defining and surrounding the opening 28. In other words, the circumference of the side wall 62 surrounding the fill opening 28 is dimensioned and disposed to be similarly shaped but somewhat less in circumference than that of the spherically-shaped sealing member 12. Then, as the sphere is force-fit into the opening 28. the circumference of the side wall 62 is expanded by this forcefit insertion so that the reactive stress force for recovering the fill opening side wall 62 to its original circumference is applied to the contact area 64 of sphere 12 thereby providing the secondary seal between sphere 12 and the opening side wall 62. Further, the side wall 62 is provided with a slight funnel taper 66 adjacent to the inside of the cell which prevents the sphere 12 from being inserted too far into the opening 28 while insuring that a projecting bulbous or protrusion portion 68 of the sphere 12 is flush or slightly recessed with respect to the upper surface of the lid 26 and is accessible from outside the cell. Thus, with the sealing sphere in its secondary sealing engagement with the side wall 62, the protruding portion 68 faces outside the cell 10 and is easily accessible therefrom.

To form the primary seal and thereby hermetically close the cell, the outwardly projecting protruding portion 68 of sealing member 12 is fused to surrounding side wall 62 such as by means of weld 70. As shown in FIG. 4, weld 70 fuses between the protruding portion 68 and the side wall 62; uniting the sealing member 12 to the surrounding wall 62 in a gas tight, hermetic engagement. In that manner, the secondary seal formed between the sphere 12 force-fit into sealing engagement with the side wall 62 of opening 28 prevents evaporated electrolyte out gassed by-products from escaping through the contact area 64 so that the welding of the protruding portion 68 to the side wall 62 is completed without pinhole defects forming in the weld. The resulting seal is completely hermetic and will not fail even after the cell has been stored or discharged for extended periods of time. Furthermore, since both weld 70 and sealing member 12 are disposed inside the perimeter of opening 28, the primary seal they form is also disposed therein. That leaves the outer surface of lid 26 with a smooth and clean appearance, free of welds and protruding sealing members.

By way of example, the illustrative cell 10 shown in FIGS. 1 and 2 can comprise an alkali metal electrochemical cell having a lithium anode in operative association with a solid cathode. In that case, the cathode is comprised of silver vanadium oxide material as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference. Cathode current collector 40 is of titanium and terminal lead 30 is of molybdenum, separators 56, 58 are of polypropylene, electrolyte 60 is a 1.0M to 1.4M solution of $LiAsF_6$ or $LiPF_6$ in a 50:50 mixture of, by volume, 1,2-dimethoxyethane and propylene carbonate, glass seal 32 is of TA-23 Hermetic sealing glass, and the sealing member 12, the casing 14 and the lid 26 are of stainless steel.

It is contemplated by the scope of the present invention that the final sealing means can seal openings of various shapes and configurations. For example, FIG. 5 illustrates another embodiment of a sealing means according to the present invention comprising a sealing member 100 having a cylindrical portion 102 with a curved head 104. Cylindrical portion 102 is sized to fit into opening 106 in lid 26A in a force-fit, secondary sealing engagement as the present invention requires, while the rounded head 104 is later welded to the surrounding side wall 108 to form the primary hermetic seal.

Similarly, FIGS. 6 and 7 illustrate further embodiments of sealing means in accordance with the present invention. In FIG. 6, a sealing member 110, comprising a frusto-conical portion 112 having a curved head 114, is force-fit into secondary sealing registry with a mating frusto-conically shaped opening 116 in lid 26B. In FIG. 7, the sealing member 120 is comprised of a cylindrical portion 122, a frusto-conical portion 124 and a curved head 126 force-fit into opening 128. Opening 128 comprises a cylindrical portion 130 and a frusto-conical opening portion 132 that receive respective cylindrical seal portion 122 and frusto-conical seal portion 124 of seal 120. The cylindrical portion 122 of sealing member 120 is force-fit into secondary sealing registry with the cylindrical opening portion 130 while the frusto-conical portion 124 is received in a force-fit secondary sealing relationship with the similarly shaped frustoconical opening portion 132 of opening 128. In that manner, the junction (indicated by dashed line 134) between the frustoconical opening portion 132 and the cylindrical opening portion 130 serves as a stop for insertion of the sealing member 120 into opening 128 so that the curved portion 126 is flush or slightly recessed with respect to the outer surface of lid 26C. Both the curved portion 114 of sealing member 110 in FIG. 6 and the curved portion 126 of the sealing member 120 in FIG. 7 are later welded to the casing side walls defining and surrounding the openings 116,128 in respective lids 26B and 26C to provide the primary hermetic seal for the cell according to the present invention.

It should be understood that the sealing members and mating openings shown in FIG. 3 and FIGS. 5 to 7 illustrate only some of the possible shapes of openings and mating sealing members that achieve hermetic closure of the cell in accordance with the present invention. It is the essence of the present invention that a hermetic closure is provided by a single sealing member of a shape that permits contact with the walls of any container opening including an electrochemical cell opening in a force-fit, secondary sealed relationship, and that an integral bulbous or protruding portion of the sealing member is then welded to the side wall defining and surrounding the opening to provide a primary hermetic seal. In that manner, the seal means of the present invention does not protrude beyond the outer surface of the cell casing to provide the casing with an aesthetic profile, unobstructed by the seal. This means that the seal will not hinder the insertion of the cell or battery into a cell receptacle provided in an implantable medical device and the like, where a premium is placed on economy of size.

It is therefore apparent that the present invention accomplishes its intended objects. While embodiments of the present invention have been described in detail, that is for the purpose of illustration, not limitation.

What is claimed is:

1. An electrochemical cell, comprising:
   a) a casing defined by an enclosing casing side wall;
   b) an anode means and a cathode means housed inside the casing and in operative electrical association with each other;
   c) an opening provided in the casing side wall for filling an electrolyte therein to activate the anode means and the cathode means, wherein the casing side wall has a thickness and provides-a perimeter surrounding the opening, and wherein the casing side wall has an outer surface not forming the opening perimeter and accessible from outside the cell; and
   d) a sealing means registered in a force-fit sealing relationship with the opening perimeter to block the opening, wherein the sealing means has an outer portion fused to and completely surrounded by the opening perimeter without having a diameter of the fused sealing means greater than that of the opening perimeter such that no part of the sealing means overlays the outer surface of the casing side wall to thereby provide a hermetic seal for the fill opening.

2. The electrochemical cell of claim 1 wherein the outer portion of the sealing means has a frusto-conical shape along and around a longitudinal axis of the side wall thickness prior to being fused to the opening perimeter.

3. The electrochemical cell of claim 1 wherein the fill opening has a circular cross-section along and around a longitudinal axis of the side wall thickness.

4. The electrochemical cell of claim 1 wherein the fill opening has a frusto-conical shape along and around a longitudinal axis of the side wall thickness.

5. The electrochemical cell of claim 1 wherein the fill opening has a cylindrical shape.

6. The electrochemical cell of claim 1 wherein the sealing means has a spherical shape.

7. The electrochemical cell of claim 1 wherein the sealing means is of a one-piece construction.

* * * * *